United States Patent [19]

Regan

[11] 4,222,590
[45] Sep. 16, 1980

[54] EQUALLY TENSIONED COUPLING APPARATUS

[75] Inventor: John Regan, Rancho Palos Verdes, Calif.

[73] Assignee: Regan Offshore International, Inc., Torrance, Calif.

[21] Appl. No.: 874,622

[22] Filed: Feb. 2, 1978

[51] Int. Cl.² ............................................. F16L 55/00
[52] U.S. Cl. ......................................... 285/14; 285/18; 285/97; 285/306; 285/363; 285/321; 285/DIG. 21; 403/15; 85/1 T
[58] Field of Search ..................... 285/18, 14, 24, 321, 285/27, 39, 96, DIG. 21, 363, 405; 403/15, 34; 29/252, 452; 254/29 A; 85/1 T, 32 T

[56] References Cited

U.S. PATENT DOCUMENTS

| | | | |
|---|---|---|---|
| 2,866,370 | 12/1958 | Biach | 285/18 X |
| 3,216,540 | 11/1965 | Blinn | 29/452 |
| 3,835,523 | 9/1974 | Stansfield | 29/452 |
| 3,886,707 | 6/1975 | Heldt | 85/1 T |
| 4,085,649 | 4/1978 | Christensson | 85/1 T |

FOREIGN PATENT DOCUMENTS 1257421  2/1961  France .................................... 85/1 T
1549954  11/1968  France .................................... 285/405

Primary Examiner—Dave W. Arola
Attorney, Agent, or Firm—Poms, Smith, Lande & Rose

[57] ABSTRACT

The present invention discloses method and apparatus for connecting together two members having mating surfaces by means of a plurality of fasteners such that equal compression forces are exerted on the members along force lines normal to a common plane. To accomplish the foregoing objectives, a plurality of pins are carried by one member and pass through bores in the opposite member. The pins are longitudinally extended simultaneously with a common internal extending force and stops are affixed to the ends extending through the second member snugly against the surface thereof. Upon release of the common extending force, all the pins attempt to restore to their original positions with equal restorative forces being equal and opposite to the common extending force applied thereto.

10 Claims, 7 Drawing Figures

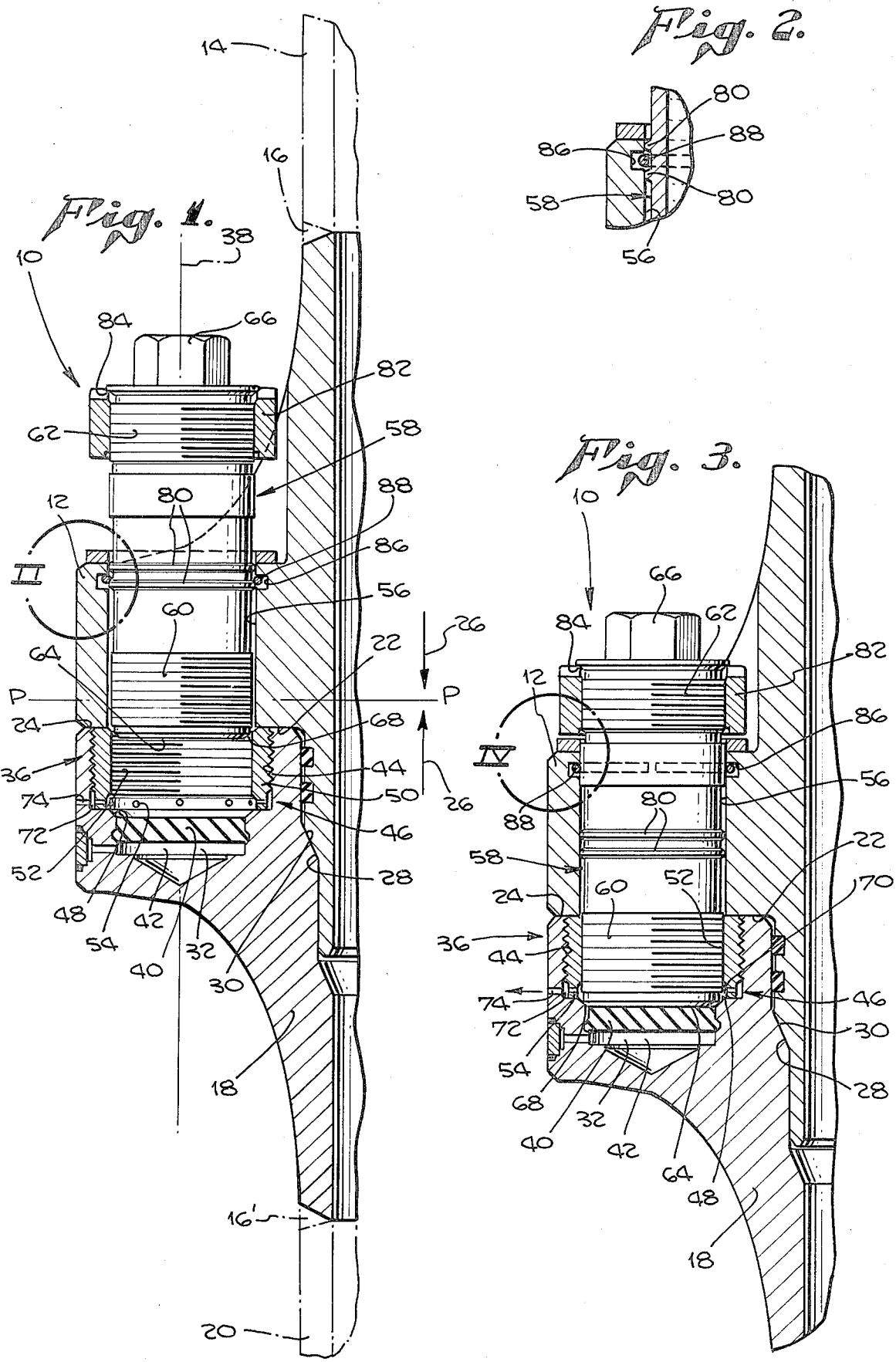

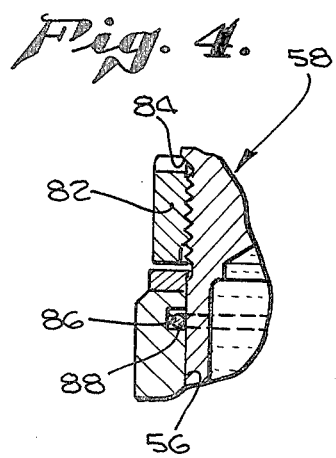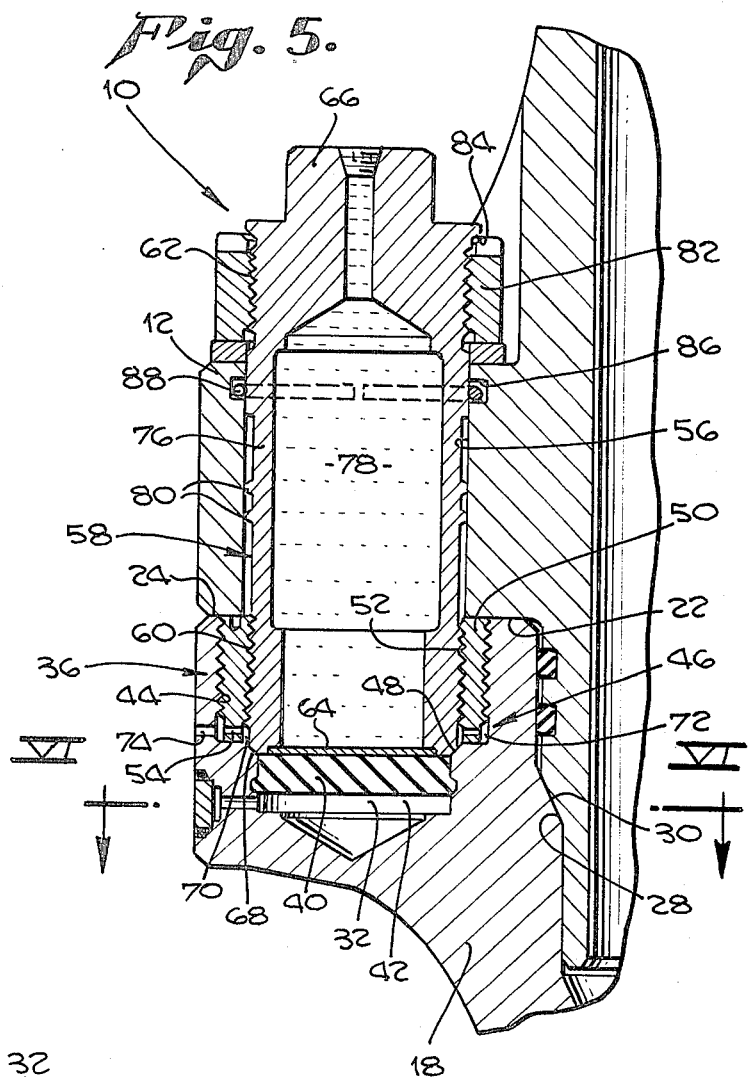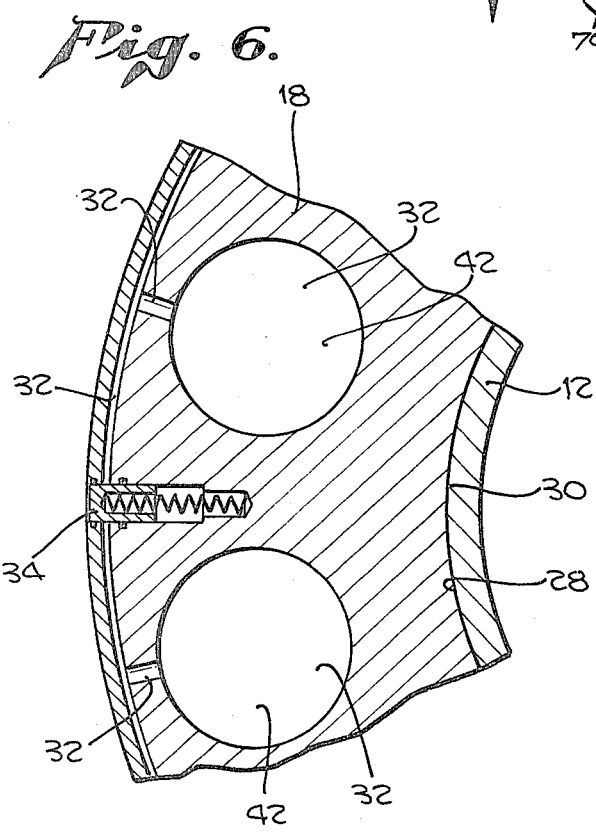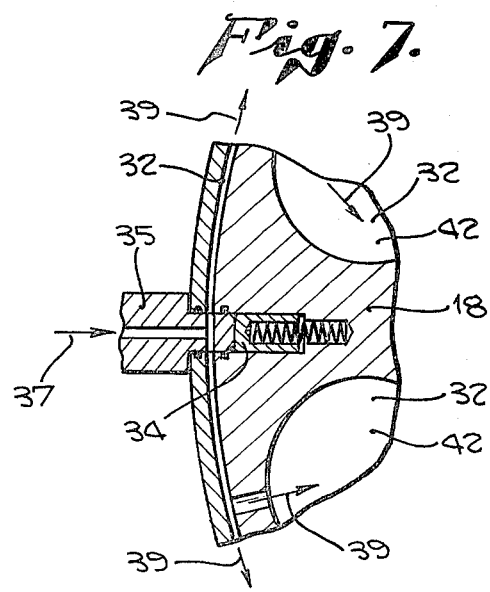

EQUALLY TENSIONED COUPLING APPARATUS

BACKGROUND OF THE INVENTION

The present invention relates to means for fastening two members together and more particularly to such fastening means having provision for causing a plurality of fastening means to create equal compression forces on the two members being held together thereby.

There are numerous instances wherein two members having mating surfaces must be releasably held together in such a manner that the compressive forces holding the members together are substantially equal over the entire mating surfaces thereof. One well-known example of such an application is the mounting of cylinder heads on reciprocating piston engines and compressors. In such apparatus it is sufficient to have threaded studs passing through bores within the cylinder head to be fastened down by nuts equally tensioned by measured forces such as available with a torque wrench.

Underwater drilling apparatus poses a similar problem but one increased in scale. In such sub-sea drilling apparatus, a riser pipe extends from the ocean floor to a floating platform or vessel on the ocean's surface. Because of the extreme depths involved, the riser cannot be made in one single section. Therefore, the riser comprises a plurality of conduit sections coupled together. Contrary to the cylinder head of the foregoing example which usually remains fastened together for months or years on end, the marine riser conduit sections must be taken apart and reassembled as the marine riser conduit is raised and lowered from the ocean's floor.

Even more important, however, the structure of the conduit and the forces exerted thereon created problems not present in less stringent applications. To prevent damage to and/or loss of valuable equipment, the marine riser conduit section couplings must resist tension and bending loads created therein. In particular, they must be designed to resist "stress concentrations" which are defined as stresses greater than two times the average stress present in the linear riser conduit sections. Since the average stress present in the linear riser conduit sections may be as high as 25,000 pounds per square inch, it can be seen that great care must be taken to assure uniform tensioning of the connectors in the coupling sections.

In the copending patent application Ser. No. 783,636, now U.S. Pat. No. 4,183,562, entitled "Marine Riser Conduit Section Coupling Means" by Bruce J. Watkins and A. Michael Regan, assigned to the common assignee of this application, a coupling for such marine riser conduits is described incorporating a design whereby an optimum curve is employed transferring from a portion adapted for mating with the riser casing to a horizontally disposed flange having the mating surface disposed thereon such that stresses created within the coupling are optimally transferred. In the coupling described in said application, the flanges are connected together by a plurality of radially equally spaced bolts passing through bores in the flange of the coupling upper member threaded into a threaded bore in the flange of the coupling lower member. In particular, in the example as shown in the application there are twelve bolts connecting the upper flange to the lower flange. Because of the critical nature of the fastenings of the two members together, the aforementioned technique employed in engines and pumps whereby the threaded connections are tightened by torque measuring apparatus, cannot be employed to achieve equal compression from each bolt. Variations in threads and the smoothness of mating surfaces rotated relative to one another as well as the presence of friction-producing agents within the threads of the mating parts make torque measurement an inaccurate means of determining the compressive force being created by the connecting bolts. Thus, the standard bolt tightening technique is to grip the bolts individually and apply an extending force thereto as the bolts are snuggly tightened down against the upper flange. Upon release of the external extending force, the restorative forces of the material of the bolt will cause it to contract thereby exerting a compression force against the upper flange equal to the extension force applied thereto. Such a method is time consuming and still prone to inaccuracies inasmuch as all the bolts cannot be simultaneously extended by a common extending force. Thus, in most such tightening operations either by the extension method or the torque wrench method it is common practice to partially tighten the bolts in steps according a preset pattern whereby the members are drawn into equal compressive loading throughout.

Wherefore, it is the objective of the present invention to provide method and apparatus for replacing the bolts employed in such prior art apparatus by fasteners which can be extended simultaneously by a common internal extending force to allow a one-step fastening and unfastening of two members requiring such equalized compressive holding together thereof.

SUMMARY

The objectives of the present invention have been incorporated in apparatus for connecting together two members having mating surfaces by means of a plurality of fasteners causing equal compression forces to be exerted on the members along force lines normal to a common plane by having one of the members including an integral manifold adapted for connection to a source of fluid under pressure, the member also including a plurality of bores extending into the member from the side thereof having the mating surface along lines normal to the common plane to connect into the integral manifold, and further including means for releasably and sealably engaging pins inserted into the bores; the other of the members including a plurality of bores concentrically aligned with the bores in the one member; a plurality of hollow, cylindrical, fluid-filled pins inserted into respective ones of the bores of the one member, each of the pins having a deformable diaphragm on the end thereof inserted into the bores and means for engaging the engaging means of the one member whereby the pins are held in the bores with the deformable diaphragms in sealed communication with the integral manifold, the pins each also being non-deformable on the end not inserted into the bores and having means adjacent the last-named end for releasably and adjustably engaging a stop, the portion of the pins not inserted into the bores of the one member being adapted to pass through the bore in the other member having sidewalls between the two ends of a thickness so as to resist lateral deformation while allowing maximum longitudinal extensibility in response to pressurization of the internal fluid; and, a plurality of stops adapted for mounting adjacent the non-deformable end of respective ones of the pins, the stops being unable to pass through the bores in the other member and including means for engaging the stop engaging means on the pins whereby the stops can be releasably positioned longitudinally on the pins close adjacent the other member opposite the mating surface thereof with the pins longitudinally extended through the application of fluid pressure through the internal manifold and the deformable diaphragm to the internal fluid so that the pins will subject the two members to identical compression forces through the stop by the restorative force of the pins when the fluid pressure is released from the manifold.

DESCRIPTION OF THE DRAWINGS

FIG. 1 is a partially cut-away elevation through the area of one connector pin of the present invention as employed in a marine riser conduit coupling with the connector pin in its disconnected position.

FIG. 2 is a detailed, enlarged, cut-away view of the area II of FIG. 1.

FIG. 3 is the apparatus of FIG. 1 with the connector pin in its connected position in an untightened state whereby no compressive force is created on the coupling.

FIG. 4 is a detailed, enlarged, cut-away view of the area IV of FIG. 3.

FIG. 5 is the apparatus of FIG. 1 with the connector pin conected and tightened to create a compressive force on the coupling.

FIG. 6 is a cut-away plan view of the apparatus of FIG. 5 in the plane VI—VI.

FIG. 7 is a detailed view of the fitting of FIG. 6 with a stab connector inserted for the application of fluid pressure to the apparatus through the internal manifold incorporated therein.

DESCRIPTION OF THE PREFERRED EMBODIMENT

The conduit section coupling of the present invention is generally indicated as 10 in FIGS. 1, 3 and 5. The coupling 10 comprises an upper portion referred to as the "pin flange" 12 adapted to be connected to an upper riser casing 14 such as by weld 16 and a lower section referred to as the "box" 18 adapted for connection to a lower riser casing 20 such as by weld 16'. With the bores of upper riser casing 14 and lower riser casing 20 in axial alignment, the pin flange 12 and box 18 have mating surfaces 22 and 24 respectively machined to meet in a common plane circumferentially about the coupling 10. Thus, it is desired to create compressive forces as indicated by the arrows 26 which are normal to a plane parallel to the mating surfaces 22, 24 such as that labeled P—P in FIG. 1. In the preferred embodiment of the present invention as applied to the conduit coupling section of a marine riser, the plane P—P is parallel to the mating surfaces 22, 24 having the longitudinal axis passing through upper riser casing 14 and lower riser casing 20 normal thereto. As can be seen from FIG. 1, other secondary mating surfaces can be provided within the conduit section coupling 10 not in a plane parallel to the plane P—P. Such an example are the angled mating surfaces 28, 30. Having picked the plane P—P as the plane to which all compressive forces will be made normal, it can be seen that the forces through the secondary mating surfaces 28, 30 will pass angularly therethrough.

As can be seen by reference to FIGS. 6 and 7, the box 18 is provided with an integral manifold 32 having a fitting 34 communicating therewith adapted for insertion of a "stab connector" 35 providing a source of fluid 37 under pressure. Box 18 is further provided with a plurality of radially equally spaced bores generally indicated as 36 extending from mating surface 24 concentrically with an axis 38 normal to the plane P—P to the internal manifold 32. The lower portion of each bore 36 has a rubber washer 40 disposed therein. Integral manifold 32 is filled with hydraulic fluid 42 which is prevented from exit therefrom by the self-sealing fitting 34 and the plurality of rubber washers 40 blocking the bottom of the bores 36. When a connector 35 is connected to fitting 34 as shown in FIG. 7, pressurized fluid 37 applies equal force throughout the fluid 42 in manifold 32 as indicated by the arrows 39. The upper portion of each bore 36 is provided with internal threads 44. In between the internal threads 44 and rubber washer 40 there is an unthreaded portion generally indicated as 46 including a "seat" portion 48 adjacent rubber washer 40. The reason for the foregoing will become apparent from the description which follows hereinafter. An internally and externally threaded sleeve 50 is threaded into the upper portion of each bore 36. Threaded sleeves 50 are provided for the usual reason, that is, in the event of the galling of internal threads 52 thereof, sleeve 50 can be replaced as opposed to requiring the complete replacement or complicated re-threading of box 18. Threaded sleeves 50 also have the lower portion thereof unthreaded and of reduced wall thickness to provide additional benefits to be described hereinafter. The unthreaded lower portion of each sleeve 50 is provided with a plurality of circumferentially spaced holes 54 passing between the inside and outside the threaded sleeve 50.

The pin flange 12 is provided with a plurality of bores 56 in concentric alignment with the bores 36 of box 18. Bores 56 are of a diameter so as to be a clearance fit for threads suited for engagement with the internal threads 52 of the threaded sleeves 50.

The compressive force holding pin flange 12 against box 18 is provided by a plurality of hollow pins generally indicated as 58. Hollow pins 58 are cylindrical in shape having threads 60 on the bottom thereof suited for engagement with threads 52 of sleeves 50 and threads 62 on the top thereof. The bottom of each pin 58 is closed by a thin deformable diaphragm 64 and the top is closed by a non-deformable end including a hexagon-shaped protrusion 66 by which the pins 58 can be screwed into and out of the threaded sleeves 50. The bottom of hollow pins 58 is also provided with a seating portion 68 adapted to sealably mate with the seat portions 48 of bores 36. With pins 58 screwed into threaded sleeves 50 as shown in FIG. 3, seating portion 68 is sealably mated with seat portion 48 and deformable diaphragm 64 is tight against rubber washer 40. Additionally, an internal chamber 70 is created circumferentially between the bottom of hollow pins 58 and the inside of threaded sleeve 50 and an external chamber 72 is created circumferentially between the outside of threaded sleeve 50 and bore 36 because of the thin-walled unthreaded portion 46 of threaded sleeve 50 having holes 54 therein discussed hereinbefore. Thus, the holes 54 communicate between each internal chamber 70 and its associated external chamber 72. A pressure relief passage 74 is provided between the atmosphere and each external chamber 72. Chambers 70, 72 and passages 74 provide a passageway for the egress of trapped air and fluid as the pins 58 are threaded into the sleeves 50.

As can be seen in FIG. 5, the sidewalls 76 of hollow pins 58 are thinner than any other portion of hollow pins 58 with the exception of the deformable diaphragm 64. In like manner to integral manifold 32, the hollow interior of pins 58 is filled with hydraulic fluid 78. As can now be seen, if a source of pressurized fluid is connected to fitting 34, the pressure will be transmitted into hydraulic fluid 42 within integral manifold 32 as discussed with reference to FIG. 7. Rubber washer 40 will be forced by the pressure in hydraulic fluid 42 against diaphragm 64. Being deformable, diaphragm 64 will be deformed into the interior of hollow pin 58 to exert pressure against hydraulic fluid 78. By being thinner, the sidewalls 76 are made the weakest point of the pressurized container formed by pins 58. The sidewalls 76 are made thick enough that, being a cylinder, they will resist lateral deformation but will tend to stretch in response to the increased pressure within pins 58. Thus, an internal force can be created within pins 58 tending to longitudinally extend them. To aid in preventing lateral deformation of sidewalls 76, a pair of raised ridges 80 are provided substantially midway between the threaded ends which are adapted to remain in sliding contact with the internal walls of bores 56. Ridges 80 also provide an additional benefit to be described hereinafter.

The top threads 62 of each hollow pin 58 has a nut 82 threaded thereon. Nuts 82 thus provide longitudinally adjustable stops on pins 58. To prevent loss of the nuts 82, it is preferred that the top end of pins 58 be provided with a shoulder 84 as shown. In such case, top threads 62 and bottom threads 60 are made identical whereby nuts 82 are first threaded across bottom threads 60 and thence onto top threads 62 before pins 58 are threaded into sleeves 50. As a further safety measure, each bore 56 is provided with an internal groove 86 containing a snap ring 88. As can be seen in FIGS. 1 and 2, each pin 58 can be withdrawn to a point where its respective snap ring 88 is disposed between the two ridges 80 previously described to thus hold pins 58 in disengagement from box 18 while simultaneously preventing the loss of pins 58.

To connect the two casings 14, 20 by the conduit section coupling 10 of the present invention, pins 58 are first withdrawn to the disengaged position shown in FIGS. 1 and 2. Nuts 82 are backed off against shoulders 84 as shown in FIG. 1. Pin flange 12 and box 18 are brought into proper alignment by aligning means (not shown) with mating surfaces 22, 24 in contact. By so doing, bores 36 and 56 are in concentric alignment along axes 38. All the pins 58 are threaded into the threaded sleeves 50 of respective adjacent bores 36 in sealed engagement with the rubber washers 40. A source of pressurized fluid at a pressure equal to the desired compressive pressure to be exerted by pins 50 on mating surfaces 22, 24 is connected to fitting 34 in the manner described in relation to FIG. 7. The pins 58 are simultaneously longitudinally extended thereby to a point wherein each pin 58 has the restorative force thereof equal and opposite to the longitudinally extending force of the hydraulic fluid 78 interior thereof. At such point, all the nuts 82 are snuggly tightened down against the top of pin flange 12 an equal amount. The source of external pressure then is removed from fitting 34 causing the pins 58 to simultaneously attempt to restore themselves to their unextended position. Nuts 82 now being firmly against the top of pin flange 12, the pins 58 are unable to retract to their unextended position and, thereby, all exert equal compressive forces on the pin flange 12 and box 18.

While the present invention as hereinbefore described is designed primarily for use in the connection of marine riser conduit sections as employed in undersea drilling operations, it will be understood by those skilled in the art that the present invention can be adapted for implementation in any application wherein the benefits attendant thereto are desired.

Having thus described by invention, I claim:

1. Coupling apparatus for releasably coupling a pair of conduits comprising:
    (a) a first connector member adapted to connect to one of the conduits on one end and having a flange on the other end, said flange having a plurality of radially spaced holes therethrough;
    (b) a second connector member adapted to connect to the other end of the conduits on one end and having a flange on the other end, said flange of said second connector member being adapted to mate with said flange of said first connector member when the two conduits are disposed in end-to-end relationship;
    (c) a plurality of connector pins carried by said flange of said second connector member on one end and means connecting said one end to said flange of said second connector member, said pins having threads on the opposite end, said pins being disposed to pass through said holes with said threads projecting therefrom, said pins further being hollow cylinders filled with a first fluid and having sidewalls sufficiently thick to resist lateral deformation and only extend the pin when said first fluid is pressurized;
    (d) a plurality of nuts adapted for threaded engagement with said threaded ends; and,
    (e) means for internally exerting an identical longitudinal extending force on said pins whereby said nuts can be threaded onto said threads of each of said pins to snug engagement with said flange of said first connector member with said pins under said longitudinal extending force whereby with said longitudinal extending force removed therefrom all said pins are under identical tension, said extending force exerting means comprising a passageway filled with a second fluid disposed in pressure transmitting communication with said first fluid in each of said plurality of pins at respective interfaces thereof, said passageway being adapted for connection to a source of hydraulic pressure whereby upon connection of said passageway to a source of hydraulic pressure equal forces are transmitted through said second fluid to said first fluid and all said pins simultaneously so that said pins are subjected to an equal internal expanding force only by said first fluid under pressure.

2. The coupling apparatus claimed in claim 1 and additionally comprising:
    sealing means disposed at said respective interfaces between said first fluid and said second fluid.

3. The coupling apparatus claimed in claim 1 wherein:
    (a) said passageway is an annular passageway disposed in said flange of said second connector member;
    (b) said pins include a pressure deformable portion communicating with said first fluid; and, (c) said flange of said second connector member includes a plurality of connecting passageways disposed between said annular passageway and said pressure deformable portion of respective ones of said pins.

4. The coupling apparatus claimed in claim 3 wherein:
(a) said pins are releasably carried by said flange of said second connector member by said means connecting said pins to said flange of said second connector member; and,
(b) said apparatus additionally comprises a plurality of deformable seals disposed in respective ones of said connecting passageways between said second fluid and said pressure deformable portion of said pins and in contact with said latter named portion whereby said pins can be removed and replaced without loss of said second fluid.

5. In apparatus for connecting together two members having mating surfaces by means of a plurality of fasteners, the improvement for causing equal compression forces to be exerted on the members along force lines normal to a common plane by all the fasteners comprising:
(a) one of the members including an integral manifold adapted for connection to a source of fluid under pressure, the member also including a plurality of bores extending into the member from the side thereof having the mating surface along lines normal to the common plane to connect into said integral manifold, and further including means for releasably and sealably engaging pins inserted into said bores;
(b) the other of the members including a plurality of bores concentrically aligned with said bores in the one member;
(c) a plurality of hollow, cylindrical, fluid-filled pins inserted into respective ones of said bores of the one member, each of said pins having a deformable diaphragm on the end thereof inserted into said bores of the one member and means for engaging said engaging means of the one member whereby said pins are held in said bores of the one member with said deformable diaphragms in sealed communication with said integral manifold, said pins each also being non-deformable on the end not inserted into said bores of the one member and having means adjacent said last named end for releasably and adjustably engaging a stop, the portion of said pins not inserted into the bores of the one member being adapted to pass through said bores in the other member, said pins having sidewalls between said two ends of a thickness so as to resist lateral deformation while allowing maximum longitudinal extensibility in response to pressurization of said internal fluid; and,
(d) a plurality of stops adapted for mounting adjacent said non-deformable end of respective ones of said pins, said stops being unable to pass through said bores in the other member and including means for engaging said stop engaging means on said pins whereby said stops can be releasably positioned longitudinally on said pins close adjacent the other member opposite the mating surface thereof with said pins longitudinally extended through the application of fluid pressure through said internal manifold and said deformable diaphragm to said internal fluid so that said pins will subject the two members to identical compression forces through said stops by the restorative force of said pins when said fluid pressure is released from said manifold.

6. The improved connecting apparatus claimed in claim 5 and additionally comprising:
(a) a plurality of deformable sealing members disposed in respective ones of said bores of the one member between said deformable diaphragm and said internal manifold and in contact with said deformable diaphragm whereby if one of said pins is removed the associated one of said bores remains sealed with respect to said internal manifold; and,
(b) a fluid filling said integral manifold in contact with said deformable sealing members whereby when said integral manifold is connected to a source of fluid under pressure the pressure will be transmitted from the last named fluid into said fluid filling said integral manifold to deform said sealing members against said deformable diaphragms to thereby deform said diaphragms against said fluid filling said pins to create a pressure within said pins to cause the longitudinal extension thereof and whereby said pins can be removed from said bores in the one member without loss of said fluid filling said integral manifold.

7. The improved connecting apparatus claimed in claim 5 wherein:
(a) the ends of said pins having said deformable diaphragms therein are threaded;
(b) said bores of the one member are threaded; and,
(c) said pin engaging means comprises internally and externally threaded sleeves threaded into said threaded bores of the one member, said pins being threaded therein, said sleeves being of reduced wall thickness in the area thereof disposed adjacent the bottom of said last named bores whereby an internal clearance area is created circumferentially between said pins and said sleeves and an external clearance area is created circumferentially between said sleeves and said bores, said reduced thickness area having a passageway therein between said internal and external areas, the one member having a passageway communicating between the atmosphere and said external clearance area whereby a relief path is created for the escape of air and fluid trapped within said bores of the one member.

8. The improved connecting apparatus claimed in claim 5 wherein:
(a) said other member has a biased gripping means in sliding engagement with said pins when said pins are disposed through said bores of said other member;
(b) said pins have means for releasably engaging said gripping means disposed to hold said pins in a position disengaged from said bores in the one member and preventing said pins from falling out of said bores in the other member.

9. The improved connecting apparatus claimed in claim 8 wherein:
(a) said bores of the other member each have a retaining groove concentrically disposed therein and said biased gripping means comprises a plurality of snap rings disposed within respective ones of said retaining grooves; and,
(b) said means for engaging said gripping means comprise at least a pair of ridges on the external sidewalls of each of said pins.

10. The improved connecting apparatus claimed in claim 9 wherein:
at least one of said ridges is disposed circumferentially about each of said pins at a point substatially at the longitudinal midpoint of said longitudinally extensible sidewalls and is in sliding contact with the sidewalls of said bore of the other member whereby lateral deformation of the sidewalls of said pins when said pins are internally pressurized is prevented.

* * * * *